United States Patent
Thomas

[19]

[11] Patent Number: 6,089,591
[45] Date of Patent: Jul. 18, 2000

[54] BALL ASSEMBLY FOR A TRAILER HITCH

[75] Inventor: Charles B. Thomas, Gibraltar, Mich.

[73] Assignee: Valley Industries, Madison, Mich.

[21] Appl. No.: 08/993,249

[22] Filed: Dec. 18, 1997

[51] Int. Cl.[7] .................................................... B60D 1/01
[52] U.S. Cl. ............................................................ 280/511
[58] Field of Search ............................ 280/415.1, 416.1, 280/504, 511, 514

[56] References Cited

U.S. PATENT DOCUMENTS

| | | |
|---|---|---|
| 4,596,406 | 6/1986 | Van Vleet et al. . |
| 4,938,496 | 7/1990 | Thomas .................................... 280/511 |
| 5,419,576 | 5/1995 | Van Vleet .................................. 280/507 |

Primary Examiner—Robert J. Oberleitner
Assistant Examiner—C. T. Bartz
Attorney, Agent, or Firm—Rader, Fishman & Grauer PLLC

[57] ABSTRACT

A ball assembly is intended to be mounted on a stem of a tow vehicle, and to be used in conjunction with a hitch portion of a trailer hitch assembly. The ball assembly, generally, includes a body member which is substantially spherical in shape, the body member having a partial bore formed substantially vertically therein for receiving a stem of a towing vehicle therein, the body member further having first and second transverse registering apertures formed therethrough. The ball assembly also includes a locking pin which is slidably movable in the registering apertures of the body member, and structure for connecting the pin to the body member. In a preferred embodiment, the connecting structure includes an enlarged shoulder portion on the pin, and a stop member disposed in the first transverse aperture of the body member, the stop member preventing the shoulder portion from moving therepast.

14 Claims, 1 Drawing Sheet

BALL ASSEMBLY FOR A TRAILER HITCH

BACKGROUND OF THE INVENTION

1. Field of the Invention

The present invention relates to a ball assembly, for use as part of a ball and hitch combination in trailer towing. More particularly, the present invention relates to a ball assembly including a hollow ball which is removably mountable on a stem of a towing vehicle, the ball having a locking pin slidably attached thereto.

2. Description of the Background Art

Trailer hitch assemblies of many kinds are in use today. A trailer hitch assembly which incorporates a removable and replaceable ball is disclosed in U.S. Pat. No. 4,938,496. In the '496 patent, the hollow ball is attached to a stem on a tow vehicle by sliding a pin transversely through a bore formed in the ball, and also through a bore formed in the stem of the tow vehicle to retain the ball thereon. Unfortunately, in this design, the pin is not attached to the ball, and thus can be separated from the ball, and may be lost or misplaced.

A need still exists in the art for a ball assembly with a locking pin permanently retained within a hollow ball. It would be advantageous if a ball assembly could be designed which incorporated a removable and replaceable ball for mounting on a stem of a tow vehicle, and which was held thereon by a locking pin, but which kept the locking pin connected or retained to the ball in some way at all times, so that the pin was not likely to become lost.

SUMMARY OF THE INVENTION

The present invention provides a ball assembly for use as part of a trailer hitch. The ball assembly according to the present invention is intended to be mounted on a stem of a tow vehicle, and to be used in conjunction with a hitch portion of a trailer hitch assembly.

A ball assembly in accordance with the present invention, generally, includes:

a) a body member which is substantially spherical in shape, the body member having a partial bore formed substantially vertically therein for receiving a stem of a towing vehicle therein, the body member further having first and second transverse registering apertures formed therethrough;

b) a locking pin which is slidably movable in the registering apertures of the body member; and c) means for connecting the pin to the body member.

In a preferred embodiment of the present invention, the connecting means comprises an enlarged shoulder portion on the pin, and a stop member disposed in the first transverse aperture of the body member, the stop member preventing the shoulder portion from moving therepast.

Accordingly, it is an object of the present invention to provide a removable and replaceable ball assembly for use as part of a trailer hitch on a towing vehicle. It is a further object of the present invention to provide a removable and replaceable ball assembly which attaches to a stem on a towing vehicle with a locking pin, in which the locking pin is attached to the ball assembly.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 1:
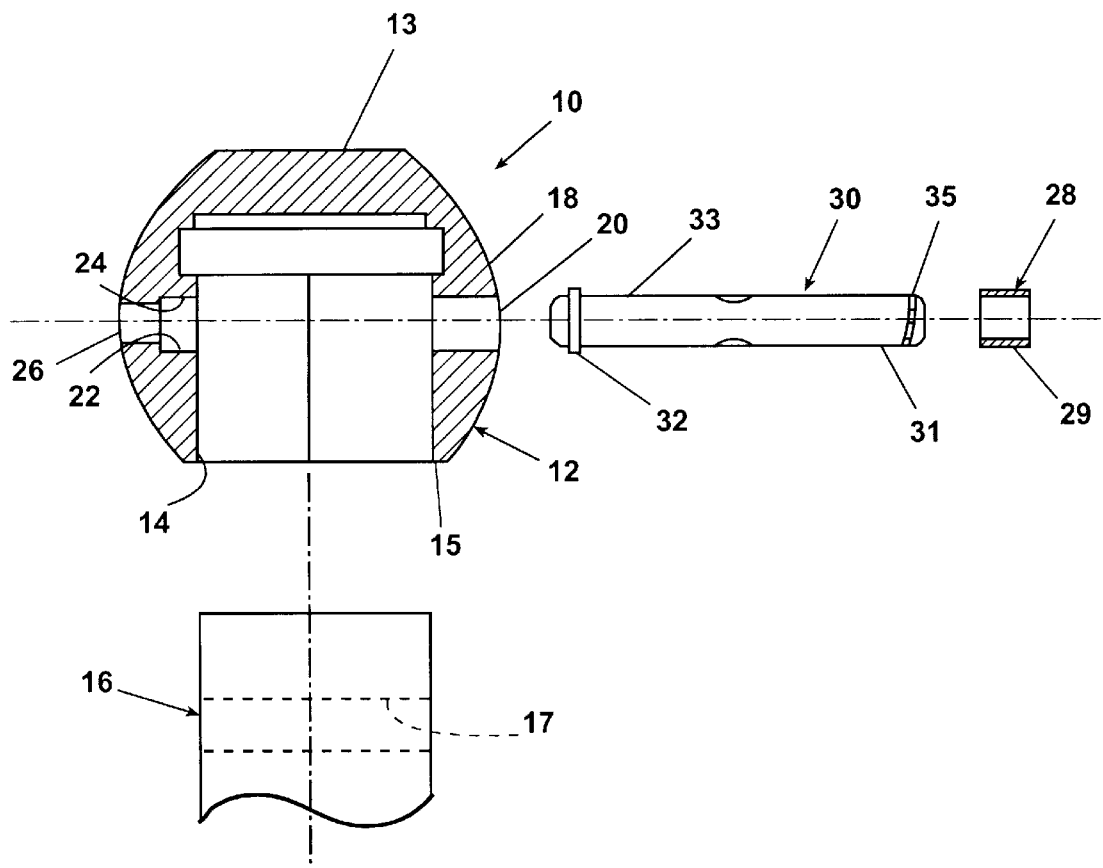
FIG. 1 is an exploded view of a ball assembly in accordance with the present invention, partially in cross-section and partially in plan view, also showing a cut away stem of a tow vehicle in plan view.

Referring now to the drawings, a ball assembly in accordance with the present invention is shown generally at 10. The ball assembly 10 is provided for mounting on to a stem 16 of a tow vehicle (not shown) and for cooperating with a hitch (not shown) in towing a trailer behind a tow vehicle.

The main components of the ball assembly 10 are the body member 12, the pin 30, and the stop member 28, each of which will be discussed in further detail hereinbelow.

As noted, the ball assembly 10 hereof includes a body member 12, which is a substantially spherical member. The body member 12 varies from being completely spherical by being flattened at the top 13 and at the bottom 15 thereof The body member 12 has a partial bore 14 formed coaxially centrally and substantially vertically therein, starting at the bottom 15 and moving upwardly through the central portion thereof, as shown, and terminating before it reaches the top 13. The partial bore 14 is provided in the body member 12 for receiving a stem 16 of a towing vehicle therein. The partial bore 14 is geometrically configured to conform to the exterior shape of the stem 16 in the well known manner. For example, the stem 16 could be cylindrically shaped and the partial bore 14 would have a corresponding cylindrical configuration. Alternatively, the stem 16 could have a hexagonal cross-section, taken in a horizontal plane therethrough, and the partial bore 14 would then have a corresponding female configuration with a hexagonal cross-section to receive the stem 16 therein. The stem 16 has a throughbore 17 formed substantially horizontally therethrough to receive a locking pin as will be further detailed hereinbelow.

In a particularly preferred embodiment thereof, the stem 16 is, preferably, of the type disclosed in U.S. Pat. No. 4,938,496, issued Jul. 3, 1990, the disclosure of which is hereby incorporated by reference. It is to be understood, however, that the present ball is not limited to that type of stem.

Referring again to the drawing, the body member 12 is further provided with first and second transverse registering apertures, openings or passages 20, 22, respectively, which are located on opposite sides of the partial bore 14 in communication therewith, and which are oriented substantially horizontally, as shown. The first and second apertures 20, 22 are provided for linear alignment with the throughbore 17 of the stem 18 to receive the pin 30 therethrough, as will be further discussed herein. The first aperture 20 extends from the exterior surface 18 of the body member 12 inwardly to the partial bore 14 at the interior thereof Similarly, the second aperture 22 extends from the exterior surface 18 of the body member 12, opposite the first aperture 20, inwardly to the partial bore 14 at the interior thereof As noted, the two apertures 20, 22 are disposed in a linear relationship to one another, and as such, are in registry. The second aperture 22 is provided with a first or enlarged diameter portion 24, located next to the partial bore, and with a reduced diameter portion 26, located next to the outer surface 18 of the body member 12, as shown. A functionally equivalent structure to that shown for the second aperture would be to have the second aperture extend only part way through the wall of the body member and be truncated, so that where the reduced diameter portion 26 is shown in the drawing, there could be solid material there instead. However, the use of the reduced diameter portion 26 is preferred in order to allow insertion of a punch (not shown) thereinto to allow forcing of the pin 30 outwardly in the eventuality that the pin may become wedged in place over time.

The ball assembly 10 according to the present invention also includes a locking pin 30 which is slidably received in the first and second transverse apertures. The pin 30 is provided with a grasping end 31, shown on the right in the drawing, and with a retaining end 33, shown on the left in the drawing opposite the grasping end. The locking pin 30 traverses the partial bore 14 and is used to interconnect the ball assembly 10 to the stem 16 of a towing vehicle by passing through the throughbore 17 thereof. The pin 30 has a length which enables it to span the distance from the exterior surface 18 of the body member 12 through the partial bore 24 and into the enlarged diameter portion 24 of the second aperture 22, while leaving a sufficient expanse of the grasping end 31 extending outwardly from the body member to allow grasping thereof by a user. The grasping end 31 of the pin 30 may be knurled, or otherwise textured, to aid in removal of the pin from the body member 12. The grasping end of the pin 30 has an external diameter slightly smaller than the inside diameter of the stop member 28.

As shown, the pin 30 includes an annular shoulder portion 32 which is integrally formed therewith, and which is circumferentially disposed around the retaining end 33 thereof The shoulder portion 32 provides an area of the pin 30 with a larger diameter than the rest of the pin. The shoulder portion 32 of the pin 30 has an outside diameter which is slightly smaller than the inside diameter of the enlarged diameter portion 24 of the second aperture 22. In this manner, the retaining end 33 of the pin 30 fits slidably inside the enlarged diameter portion of the second aperture 22, yet is prevented from sliding all the way through and exiting from the second aperture 22, by virtue of the fact that the reduced diameter portion 26 of the second aperture is too small to allow passage of the pin 30 therethrough.

An alternative structure to the integrally formed shoulder portion 32 of the pin 30, which would be equivalent to the shoulder portion, might be to form a circumferential groove (not shown) around the retaining end 33 of the pin and to place a snap ring or other clip, such as a C-clip or E-clip, around the pin and seated in the groove.

The ball assembly 10 further includes a stop member 28 which is preferably a hollow cylindrical bushing 29 formed of brass, bronze, or other metal. The bushing 29, which acts as the stop member 28, is of a size which is an interference fit in the first aperture 20 and which is pressed into place therein after the pin 30 has been slidably inserted into the body through the first aperture 20. The stop member 28, when installed in the body member 12, surrounds the pin and extends from the exterior surface 18 of the body member about half way into the first aperture 20 towards the partial bore 14 in the interior of the body member.

The pin can be slidably moved in the stop member 28 until such time as the annular shoulder portion 32 thereof contacts the innermost edge of the stop member 28. The diameter of the pin 30, at the shoulder portion 32 thereof, is too large to pass through the stop member 28, so the stop member effectively acts to permanently keep the pin 30 connected to the body member 12 of the ball assembly 10. The shoulder portion 32 is located on the retaining end 33 of the pin 30, as shown, to enable the pin to be grasped by a user of the ball assembly and withdrawn through the first aperture 20 a sufficient distance to move the retaining end 33 outside of the partial bore 14. This allows a user to completely disengage the pin 30 from the stem 16, so that the ball assembly 10 may be lifted off of the stem, while at the same time the pin is prevented from being entirely removed from attachment to the body member 12. This prevents inadvertent loss or misplacement of the pin 30 due to its physical separation from the body member 12.

In assembling the present ball assembly 10, the pin 30 is slidably inserted through the registering apertures 20, 22. Thereafter, the bushing 29 which provides the stop member 28 is inserted in the first aperture 20 until its outermost edge is flush with the outer surface 18 of the body member 12. The bushing 29 has an outside diameter substantially equal to the inside diameter of the first aperture 20, so as to fit interferingly therein, as noted. The bushing 29 further has an inside diameter slightly larger than that of the main section of the pin 30, but smaller than the diameter of the shoulder portion 32 of the pin. This enables the pin to be slidably movable within the bushing 29, up to a point where the shoulder portion 32 contacts the stop member 28.

While the inclusion of the shoulder portion 32 on the pin 30 and the stop member 28 provides a preferred means for connecting the pin 30 to the body member 12, other connecting means could be used, such as for example, a wire cable or chain (not shown) connecting the pin and the body member 12 together. Other connecting means will occur to those skilled in the relevant art.

Figure 2:
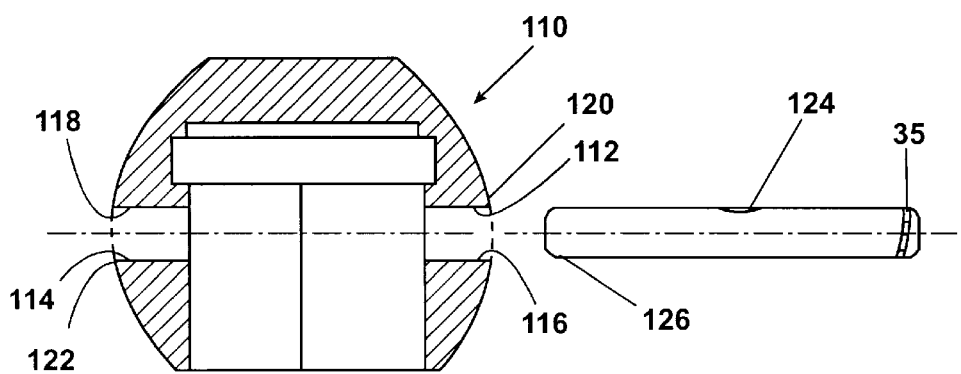
FIG. 2 is a view similar to FIG. 1, but showing an alternate embodiment hereof.

In FIG. 2, there is depicted a second embodiment hereof In accordance herewith a ball 110 has registry throughbore 112, 114 respectively. As shown, the entry 116, 118 of each throughbore 112, 114 on the surface of the ball is milled, such as by ball milling, as at 120, 122 to reduce the diameter of each bore.

A pin 124 is adapted to be slidably retained in the ball. Herein, the pin 124 is a tapered pin of varying diameter. The largest diameter of the pin 124, at a first end 126 thereof, is larger than the diameter of the entries 116, 118 of the bores 112, 114.

Similarly, by virtue of the varying diameter, the pen 124 is slidable within the bores until the interference is created with the reduced diameter portions of the bores.

In assembling this embodiment, the pin 124 is first entered into the bore by any suitable means. Once emplaced, each entry 116 and 118 is thereafter milled to close off the entries, thus, slidably trapping the pin therebetween.

In practicing the present invention, it is also possible to employ the stop member and the milled end of the throughbores to retain the pin within ball member. The stop member would include a ring 35, preferably metallic, molded thereon.

In using the ball assembly 10 in accordance with the present invention, the pin 30 is withdrawn from the body member 12 until the shoulder portion 32 thereof contacts the stop member 28. Then, the stem 16 is inserted into the partial bore 14 such that the throughbore 17 of the stem is linearly aligned with the apertures 20, 22. Then the pin 30, which has a diameter less than that of the throughbore 17, even at the shoulder portion 32 thereof, is projected therethrough and into the second aperture 22 to, thus, interconnect the ball assembly 10 to the stem 16.

If the tow vehicle is switching to a different trailer which requires a different sized ball, it is contemplated in accordance with the present invention that the ball may be removed from the stem, and a compatible ball of the required exterior size may be substituted therefor, without requiring complete removal and replacement of the trailer hitch assembly on the tow vehicle. Accordingly, the ball assembly 10 of the present invention may be manufactured in sets of different sized body diameters to accommodate different towing needs, allowing for quick changes of tow ball assemblies when needed.

It will be appreciated, by those skilled in the relevant art, that the present ball assembly enables rapid attachment and detachment thereof to a stem of a ball and hitch assembly, while preventing unwanted loss or misplacement of the locking pin thereof.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. A ball assembly for use as part of a trailer hitch assembly, the ball assembly comprising:
   a) a substantially spherical body member, the body member having a partial bore having a polygonal cross-section and formed substantially vertically therein, the bore adapted to receive a stem of a towing vehicle having a corresponding polygonal cross-section therein, the body member further having first and second transverse registering apertures formed therethrough, the polygonal cross-section of the bore cooperating with the polygonal cross-section of the stem to define means for seating the body member upon the stem;
   b) a slidably movable locking pin adapted to move within the registering apertures of the body member; and
   c) means for slidably retaining the locking pin within the body member comprising an enlarged diameter portion on the locking pin, a reduced diameter portion at the end of the first aperture, the reduced diameter portion having a diameter less than the enlarged diameter portion of the locking pin, a reduced diameter portion at the end of the second aperture, the reduced diameter portion of the second aperture having a diameter less than that of the enlarged diameter on the locking pin, the enlarged diameter of the locking pin and the reduced diameters of the first and second apertures cooperating to define the means for slidably retaining the pin in the body member.

2. The ball assembly of claim 1, wherein the polygonal cross-section of the bore is a hexagonal cross-section.

3. A ball assembly for use as part of a trailer hitch assembly, the ball assembly comprising:
   a) a substantially spherical body member, the body member having a partial bore formed substantially vertically therein, the bore adapted to receive a stem of a towing vehicle therein, the body member further having first and second transverse registering apertures formed therethrough;
   b) a slidably movable locking pin slidable between the registering apertures of the body member, the locking pin having an enlarged diameter portion; and
   c) wherein the body member has a reduced diameter portion at an end of the first aperture, the reduced diameter portion having a diameter less than the enlarged diameter portion of the locking pin, a reduced diameter portion at an end of the second aperture, the reduced diameter portion of the second aperture having a diameter less than that of the enlarged diameter on the locking pin, the enlarged diameter of the locking pin and the reduced diameters of the first and second apertures cooperating to define means for slidably retaining the pin in the body member.

4. The ball assembly of claim 3 wherein, the pin further comprises a bushing attached to one end of the pin, the bushing defining the enlarged diameter portion of the pin.

5. The assembly of claim 3, wherein:
   a) the enlarged diameter portion of the pin comprises a stop member circumferentially disposed thereupon; and
   b) each reduced diameter portion of each aperture is a ball milled end on a surface of the body member, each ball milled end defining the reduced diameter portion of each aperture, the ball milled ends cooperating with the stop member to define means for slidably retaining the pin within the body member.

6. The assembly of claim 5, wherein the stop member comprises a metallic ring molded thereon.

7. A ball assembly as recited in claim 3, wherein the reduced diameter portion at an end of one of the first and second apertures comprises an inner surface of a bushing received in the aperture, an outer surface of the bushing adjacent an inner surface of the one of the first and second apertures.

8. A ball assembly as recited in claim 7, wherein the outer surface of the bushing interferingly fits with the inner surface of the one of the first and second apertures.

9. A ball assembly as recited in claim 3, wherein the reduced diameter portion at an end of the first and second apertures comprises an opening to facilitate selective dislodgement of the pin if the pin becomes undesirably wedged into a locked position.

10. A ball assembly as recited in claim 3, wherein the enlarged diameter portion of the locking pin is integrally formed therewith.

11. A ball assembly as recited in claim 3, wherein the locking pin comprises a groove, a clip received in the groove, the groove and clip cooperating to form the enlarged diameter portion of the locking pin.

12. A ball assembly as recited in claim 3, wherein the reduced diameter portion at an end of one of the first and second apertures is integral with the body.

13. A ball assembly as recited in claim 12, wherein the reduced diameter portion at an end of one of the first and second apertures comprises the step of milling the body member.

14. A ball assembly as recited in claim 12, wherein the reduced diameter portion at an end of one of the first and second apertures comprises solid material.

* * * * *